Patented Nov. 28, 1922.

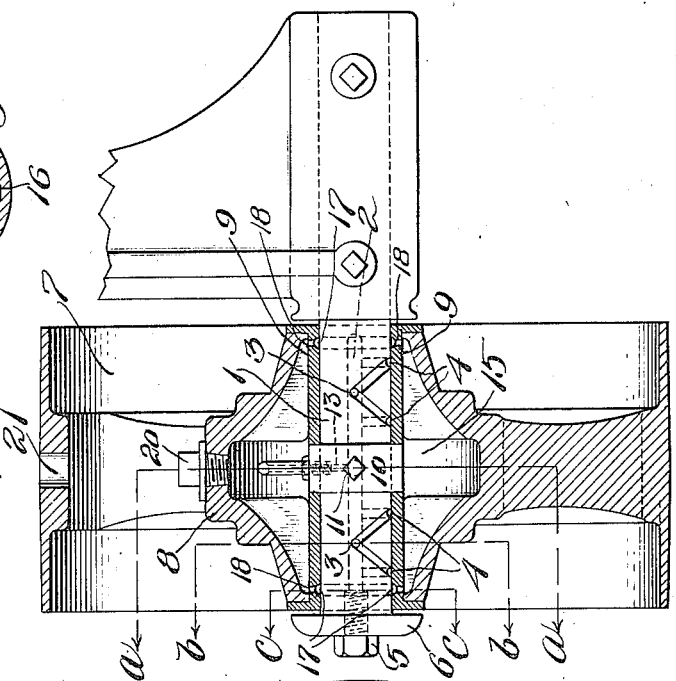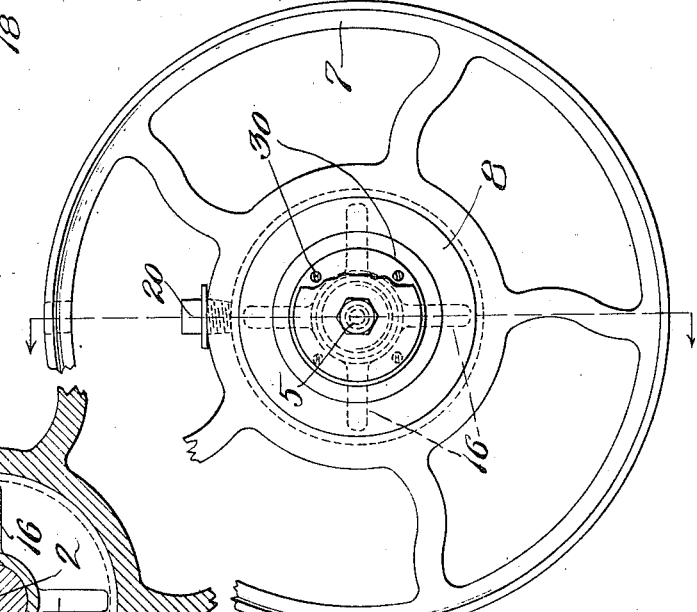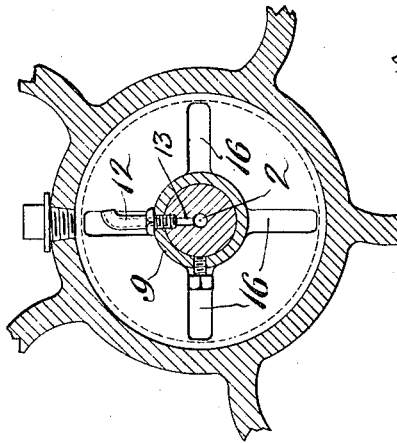

1,436,910

UNITED STATES PATENT OFFICE.

EUGENE ROBERTS, OF SALT LAKE CITY, UTAH, ASSIGNOR TO THE WESTERN STATES MACHINE COMPANY, OF SALT LAKE CITY, UTAH, A CORPORATION OF UTAH.

SELF-OILING PULLEY.

Application filed October 18, 1920. Serial No. 417,658.

*To all whom it may concern:*

Be it known that I, EUGENE ROBERTS, a citizen of the United States, and resident of Salt Lake City, in the county of Salt Lake and State of Utah, have invented certain new and useful Improvements in Self-Oiling Pulleys, of which the following is a specification.

This invention relates to self-oiling pulleys or wheels such as are mounted to turn freely upon a supporting shaft and is intended to provide effective means for maintaining constant lubrication of the rotary bearing on which said wheel or pulley rotates in relation to the supporting shaft or axle.

The invention generally speaking comprises a wheel or pulley having a hollow hub to form an internal oil chamber extending around the supporting shaft with means projecting into said oil chamber to force the circulation of oil through an interior oil duct or bore in the supporting shaft and thence through outlet passages to the rotary bearing surface whence it is returned through suitable passages to the oil chamber from which it is again forced into said oil duct in order to maintain continued circulation so long as the pulley is rotating. This and other features of the invention will be explained in this specification and will be defined in the claims hereto annexed.

In the accompanying drawings I have illustrated a preferred form of construction embodying the principles of this invention, in which:

Figure 1 is a transverse central section of the pulley mounted on the stub shaft or axle.

Figure 2 is a side elevation thereof.

Figure 3 is a detail view in central section on the plane indicated by section lines *a—a* on Figure 1.

Figure 4 is a parallel section on the plane indicated by section lines *b—b* on Figure 1.

Figure 5 is a sectional elevation on the plane indicated by section lines *c—c* on Figure 1.

In the practice of this invention according to the specific form illustrated in the drawings I provide a bearing or supporting shaft 1 which is provided with a longitudinal or axial bore 2 forming an oil duct extending approximately the full width of the pulley. Radially bored passages 3 serve to conduct the oil from this interior longitudinal oil duct to external grooves 4 formed on the outside surface of the shaft to allow the distribution of the oil on both sides of the middle plane over the bearing surface of the shaft.

The pulley or wheel, as the case may be, comprises the rim 7 with the spider hub 8 made hollow to form an annular oil chamber 15 surrounding preferably a fixed guide collar 10 that is secured to the shaft in any suitable manner as by a headed screw 11 and which serves as a guide to prevent endwise or axial movement of the pulley on the shaft thereby keeping the pulley always properly positioned.

The interior bearing surface of the hub against the shaft is formed by a two part bearing sleeve formed of the two cylindrical flanged sections 9 whose outwardly extending flanged ends are secured to the integral hub portion of the pulley by means of fastening screws 30 and whose inner ends bear against the opposite sides of the positioning or guide collar 10.

To prevent the escape of oil at the opposite ends of the bearing sleeve there is provided at each end an internal annular collecting groove 17 from which extend radial perforations or openings 18 to allow the oil collected in said grooves 17 to flow into radial passages 16 extending from the opposite end portions of the hub to the central oil chamber and flared outwardly toward the middle oil chamber so that the flow of oil may be aided or facilitated by the action of centrifugal force when the pulley is rotating.

An intake or scoop for forcing the oil from the oil chamber into the interior oil duct of the shaft is afforded by means of a properly shaped pipe or tube 12 which is tapped into a radial passage 13 leading to the interior oil duct 2. This intake tube has its opening turned in the direction from which the oil approaches it as the oil is carried along by the rotation of the pulley so that the momentum of the oil causes it to flow through said intake member or scoop with sufficient pressure to maintain the circulation through the interior oil duct to the bearing surface of the shaft and back through collecting grooves 17 and the return passages 18 to the oil chamber, this return of the oil being aided as above noted, by the action of centrifugal force.

For convenience in assembling the pulley rim is provided with a wrench opening 21 which is aligned with a similar opening in the hub leading into the oil chamber so that the fastening screw 11 of the collar 4 may be turned without removing the pulley, and the oil scoop 12 may be inserted in place after the other parts of the pulley have been assembled. This opening in the hub is normally closed by a screw plug 20 to prevent the escape of oil and to permit the introduction of a supply of oil to the oil chamber when needed.

The outer end of the oil duct 2 is closed by a screw plug 5 which may also be employed to hold a protective washer 6 against the outer end of the shaft to guard the outer end of the bearing sleeve and to prevent the pulley from flying off in case the guide collar 10 should accidentally become loose.

From the foregoing it will be seen that a perfectly continuous and reliable and positive circulation of the oil is maintained over the bearing surface whenever the pulley is in action. The term "pulley" is used to broadly designate any type of wheel or idler that is rotatably mounted on the supporting shaft or axle.

It will be observed that the end portions of the pulley hub or either side of the annular oil reservoir or chamber 15 are left solid except for the lateral return passages 16 which lie in radial planes and are flared outwardly toward the middle of the hub to permit the oil to move outwardly away from the openings 18 under the action of centrifugal force.

With the arrangement shown the combined action of the momentum of the swirling oil through the intake passage and the outward pull of the centrifugal force through the return passages 18 is secured so that a rapid and positive circulation is maintained.

What I claim is:

1. The combination with a bearing shaft provided with an interior oil duct extending longitudinally thereof to the bearing surface of the shaft, a loose pulley mounted on said shaft and embracing in its construction a hollow hub forming an oil reservoir, an interior bearing sleeve member having rotary bearing engagement with said shaft, an oil intake pipe projecting into the oil chamber and secured to the shaft and having communication with the interior oil duct of said shaft to supply oil thereto, said sleeve member being provided near the opposite end of the pulley with interior oil collecting grooves having communication with said oil chamber whereby a continuous circulation of oil is maintained, substantially as described.

2. The combination of a bearing shaft having an interior longitudinal oil duct and an intake tube projecting outwardly arranged to conduct oil under pressure to said oil duct, oil supply passages for leading the oil from said interior duct to the bearing surface of the shaft, oppositely flanged sleeve members rotatably mounted on the shaft and provided with oil collecting grooves having exterior outlets, a pulley having a hollow hub secured to said sleeve members so as to form a rotating oil reservoir for forcing oil into said intake tube and receiving oil from said oil collecting grooves, substantially as described.

3. The combination of a bearing shaft, a loose pulley mounted thereon embracing a hub having an interior oil chamber with lateral return passages, and opposed bearing sleeve members secured inside the hub to form a rotary support therefor, a guide collar secured to the shaft and having lateral abutment against the adjacent ends of the sleeve members, an intake member mounted on the shaft to project into the oil chamber to catch the swirling oil therein, the shaft being provided with oil conducting passages through which the oil entering into the intake is forced by its own momentum to lubricate the bearing and the pulley being provided with return passages arranged to prevent the endwise escape of oil from the bearing and to return it to the oil reservoir with the aid of centrifugal force, substantially as described.

4. The combination of a central bearing shaft provided with an interior longitudinal oil duct extending axially thereof and having inlet and outlet passages extending to the exterior of the shaft, an oil intake scoop pipe inserted in the inlet passage and forming an exterior continuation thereof, a loose pulley having a hollow hub forming a rotary annular oil chamber for forcing oil into said intake, the pulley being provided with return passages for leading oil from the rotary bearing back to the annular oil chamber, and preventing the escape of oil endwise from the pulley, said pulley being provided with aligned openings in its rim and hub to permit insertion of the intake tube, substantially as described.

In witness whereof, I have subscribed the above specification.

EUGENE ROBERTS.